United States Patent [19]

Newsteder

[11] Patent Number: 4,832,966
[45] Date of Patent: * May 23, 1989

[54] METHOD OF FORMING AN IMAGE WITH PHOTOGRAPHIC LIKENESS ON CHOCOLATE AND PRODUCT THEREOF

[75] Inventor: Robert Newsteder, Utica, N.Y.

[73] Assignee: Chocolate Pix, Inc., Utica, N.Y.

[ * ] Notice: The portion of the term of this patent subsequent to May 26, 2004 has been disclaimed.

[21] Appl. No.: 52,463

[22] Filed: May 20, 1987

Related U.S. Application Data

[63] Continuation-in-part of Ser. No. 892,994, Aug. 1, 1986, Pat. No. 4,668,521, which is a continuation-in-part of Ser. No. 707,552, Mar. 4, 1985, abandoned.

[51] Int. Cl.⁴ .............................................. A23G 1/22
[52] U.S. Cl. ..................................... 426/87; 426/104; 426/93; 426/96; 426/103; 426/383; 426/249; 426/515; 264/219; 264/225
[58] Field of Search ............... 426/383, 515, 104, 414, 426/87, 249, 289, 93, 96, 103; 425/177; 264/219, 220, 225, 226, 227; 101/32, 170; 249/55, 127; 156/658; 430/307, 945, 396

[56] References Cited

U.S. PATENT DOCUMENTS

| | | | |
|---|---|---|---|
| 495,341 | 4/1893 | Ives | 101/150 |
| 727,435 | 5/1903 | Pietzner | 264/219 |
| 1,502,006 | 7/1924 | Alvord | 426/104 |
| 1,792,486 | 2/1931 | Feinberg | 264/225 |
| 2,147,770 | 2/1939 | Ford | 264/219 |
| 2,181,452 | 11/1939 | Ford | 264/219 |
| 2,294,865 | 9/1942 | Frankenthal et al. | 264/219 |
| 2,952,225 | 9/1960 | Ellison | 426/383 |
| 3,101,668 | 8/1963 | Leeds | 264/226 |
| 3,251,319 | 5/1966 | Kaupert et al. | 426/515 |
| 3,277,541 | 10/1966 | Wilton et al. | 264/227 |
| 3,739,051 | 6/1973 | Smith | 264/225 |
| 4,080,634 | 3/1978 | Schreiber . | |
| 4,110,796 | 8/1978 | Aughton . | |
| 4,130,834 | 12/1978 | Mender et al. . | |
| 4,144,300 | 3/1979 | Breeden | 264/219 |
| 4,200,658 | 4/1980 | Katzman et al. | 426/515 |
| 4,240,119 | 12/1980 | Norton et al. . | |
| 4,455,320 | 6/1984 | Syrmis | 426/515 |

FOREIGN PATENT DOCUMENTS

| | | | |
|---|---|---|---|
| 605596 | 10/1925 | France | 426/383 |
| 2334509 | 8/1977 | France | 426/383 |
| 2453030 | 12/1980 | France | 426/383 |
| 4920858 | 5/1974 | Japan . | |
| WO82/00083 | 1/1982 | PCT Int'l Appl. | 426/104 |
| 161740 | 4/1921 | United Kingdom | 426/383 |
| 628886 | 9/1949 | United Kingdom | 426/383 |

OTHER PUBLICATIONS

Paperworld, 3/1888.
Swiss Colony, 1979, pp. 104–107.

Primary Examiner—Steven Weinstein
Attorney, Agent, or Firm—Cobrin, Feingertz & Godsberg

[57] ABSTRACT

A method of reproducing in chocolate a selected image, comprising the steps of optically scanning the image, laser etching the selected image in a surface of a plate in response to the optical scanning such that peaks and valleys are created in the surface of the plate corresponding to the selected image, controlling the laser etching by a scanning laser or a displayed frame of the image, casting a deformable transfer blanket against the surface of the etched plate surface to record in a surface of the transfer blanket peaks and valleys corresponding to the selected image, casting a chocolate material against the surface of the transfer blanket to record the selected image by peaks and valleys in a surface of the chocolate, and removing the cast chocolate material from the transfer blanket.

26 Claims, 4 Drawing Sheets

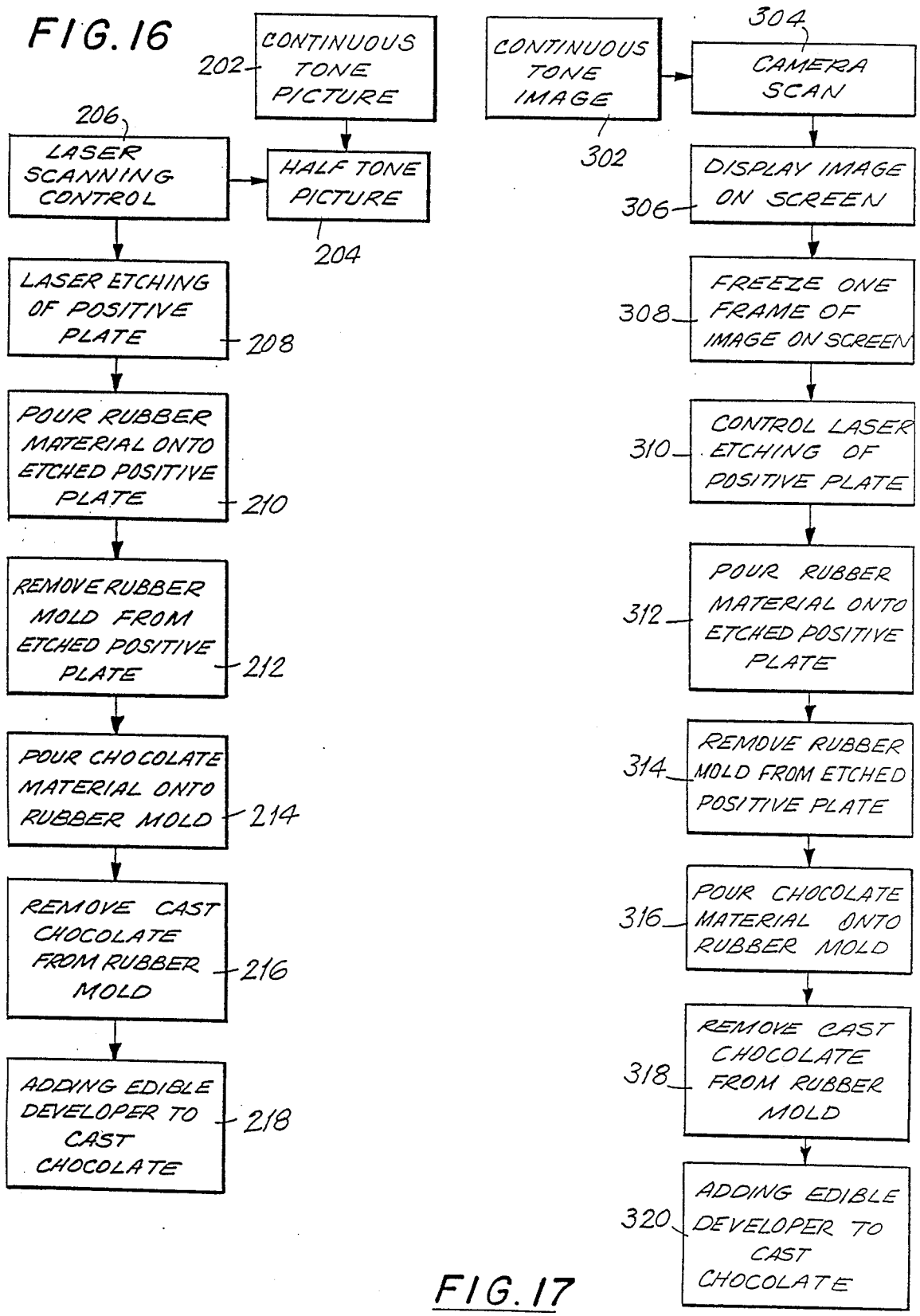

METHOD OF FORMING AN IMAGE WITH PHOTOGRAPHIC LIKENESS ON CHOCOLATE AND PRODUCT THEREOF

CROSS REFERENCE TO RELATED APPLICATIONS

This application is a continuation-in-part of my co-pending application Ser. No. 06/892,994, filed Aug. 1, 1986, in the name of Robert Newsteder for an invention entitled METHOD OF FORMING AN IMAGE WITH PHOTOGRAPHIC LIKENESS ON CHOCOLATE now U.S. Pat. No. 4,668,521, which in turn, is a continuation-in-part of my co-pending application Ser. No. 06/707,552, filed Mar. 4, 1985, in the name of Robert Newsteder for an invention entitled IMAGING ON A CASTABLE SUPPORT MATERIAL, now abandoned.

BACKGROUND OF THE INVENTION

This invention relates to a process for producing a photographic quality likeness of a photographic image on the surface of a chocolate candy.

Images are typically created in castable materials by simply casting the material against a mold surface having a pattern cut or otherwise formed therein. The mold pattern is a reversal of the desired image to be reproduced. The quality of the final image is to a large extent dependent upon the amount of detail that is contained in the mold pattern. High quality molds require a good deal of fine detail and are very expensive to construct. Because of the mold costs involved, these quality molds are typically used in the manufacture of high priced items, or those that can be mass produced and sold on a high volume basis.

In the case of molded candies or wax figures of the type traditionally sold on holidays, such as Christmas and Easter, where the items are both inexpensive and consumable, the cost of a high quality mold cannot ordinarily be justified unless a very large sales volume of a specific item is anticipated, such as plastic molded items, certainly not "customized" items of the type involving photos, etc. Inferior molds are therefore generally used in fabricating low priced items or limited quantity times and, as a consequence, the image recorded upon the final support material lacks detail and is relatively poor. Manufacturers of candies and the like sometimes place the company name or logo in the product using a die or some other device capable of producing a line art replication of the design. These processes, however, are incapable of recording what might be termed photographic quality images on the castable material.

U.S. Pat. No. 4,200,658 issued to Sandra Katzman, et al. on Apr. 29, 1980 discloses a method for making candy (hereinafter "the Katzman patent"). The Katzman patent is intended to make novelty chocolate items but simply is not up to the task of making chocolate having a photographic likeness image formed thereon which can be "developed" at will be a person.

In the Katzman patent, a continuous tone photograph of the type that would be obtained with a regular hand-held camera is first attained. The next step in the Katzman patent is to convert the photographic print into a line art drawing. This requires the services of a skilled artist and the final result is limited by both artistic subjectivity and budget. A typical charge to convert a photographic portrait of a person to a line art drawing of the type contemplated by the Katzman patent would be in the area of $100 to $150, depending upon the skill of the artist and the quality of the work. This, of course, could vary depending on many factors. Without the conversion of the photographic print into a drawing of line art work, the Katzman process comes to a total halt. A sample mold including line art work according to the Katzman process would cost approximately $500 to $1,000.

Furthermore, with the Katzman patent it is impossible to get an image that can be "developed" by applying an edible "developer" to the chocolate product which enables a person, upon application of the developer, to see the image which was previously not visible. In the Katzman patent, the chocolate simply does not produce an image having photographic likeness.

For all of these reasons, the Katzman patent is of limited utility and commercially undesirable in forming photographic likeness images on chocolate products.

SUMMARY OF THE INVENTION

It is an object of the present invention to economically create a quality photographic image with apparent continuous tone in the surface of a chocolate material where the image can be made visible by means of an edible developing medium, thus enhancing the desirability of the chocolate product.

As used herein, "photorelief imaging" means the formation of a relief image on a photosensitive element wherein such photosensitive element may be a photoengraving plate, a photopolymer, etc.

According to one aspect of the present invention, a method of reproducing in chocolate a selected image from a fulltone photograph with photographic likeness includes the step of forming on film a halftone image of the selected full-tone image located on the photograph. The selected halftone image on the film is photorelief imaged in a photosensitive element such that peaks and valleys are created in the photosensitive element corresponding to the selected image. A deformable transfer blanket is cast against the photosensitive element surface to record in a surface of the transfer blanket peaks and valleys corresponding to the selected image. A chocolate material is cast against the surface of the transfer blanket to record the selected image by peaks and valleys in the surface of the chocolate. An edible developer that contrasts in color with the chocolate is placed in the valleys formed in the chocolate with the chocolate peaks protruding above the developer to render the image formed in the chocolate visible with photographic likeness.

According to another aspect of the present invention, a method of reproducing in chocolate a selected image, includes the steps of optically scanning the image, laser etching the selected image in a surface of a plate in response to the optical scanning such that peaks and valleys are created in the surface of the plate corresponding to the selected image, casting a deformable transfer blanket against the surface of the etched plate surface to record in a surface of the transfer blanket peaks and valleys corresponding to the selected image, casting a chocolate material against the surface of the transfer blanket to record the selected image by peaks and valleys in a surface of the chocolate, and removing the cast chocolate material from the transfer blanket.

According to still another aspect of the present invention, a method of reproducing in chocolate a selected image from a fulltone photograph with photographic likeness, includes the steps of forming on film a halftone image of the selected image located on the photograph, optically scanning the film, laser etching the selected halftone image on the film in a surface of a plate in response to the optical scanning of the film, such that peaks and valleys are created in the surface of the plate corresponding to the selected image, casting a deformable transfer blanket against the surface of the etched plate surface to record in a surface of the transfer blanket peaks and valleys corresponding to the selected image, casting a chocolate material against the surface of the transfer blanket to record the selected image by peaks and valleys in a surface of the chocolate, and removing the cast chocolate material from the transfer blanket.

According to yet another aspect of the present invention, a method of reproducing in chocolate a selected image from a continuous tone image, includes the steps of optically scanning the continuous tone image, displaying the scanned image on a screen of a cathode ray tube, laser etching the selected image in a surface of a plate in response to the display of the optical scanning such that peaks and valleys are created in the surface of the plate corresponding to the selected image, casting a deformable transfer blanket against the surface of the etched plate surface to record in a surface of the transfer blanket peaks and valleys corresponding to the selected image, casting a chocolate material against the surface of the transfer blanket to record the selected image by peaks and valleys in a surface of the chocolate, removing the cast chocolate material from the transfer blanket, and placing an edible developer that contrasts in color with the cast chocolate in the valleys formed in the chocolate with the chocolate peaks protruding above the developer to render the selected image formed in the chocolate visible with photographic likeness.

According to a further aspect of the present invention, a cast chocolate product is provided having a surface formed with peaks and valleys therein which form a half tone image having photographic likeness when developed.

The above and other objects, features and advantages of the present invention will become readily apparent from the following detailed description thereof which is to be read in connection with the accompanying drawings.

BRIEF DESCRIPTION OF THE DRAWINGS

For a better understanding of these and other objects of the present invention, reference is made to the following detailed description of the invention which is to be read in conjunction with the associated drawings wherein:

FIG. 16 is a flow chart diagram showing the operational steps of forming an image with photographic likeness on chocolate according to another embodiment of the present invention; and FIG. 17 is a flow chart diagram showing the operational steps of forming an image with photographic likeness on chocolate according to still another embodiment of the present invention.

DESCRIPTION OF THE INVENTION

Figure 1:
FIG. 1 is a partial view showing a halftone image that has been prepared from a continuous toned photograph of an original wherein the tonal quality of the image is defined by a plurality of cells in a dot matrix pattern equally spaced but of varying sizes.

The present invention shall be described with particular reference to a process for faithfully recording image information in the surface of chocolate to provide, a high quality replica of the original. As will become evident from the disclosure below, the present imaging process can be used to create photographic likenesses of a selected image in chocolate. Because the present image recording process can be rapidly and economically carried out, it is ideally suited for use in the manufacture of many kinds of low volume inexpensive consumable items such as chocolate novelty items. The present image recording process will be herein described with particular reference to recording a photograph-like portrait of a person upon a chocolate greeting card and developing the recorded image using an edible confectionary. The portrait depicted in the drawings is that of a male character having a head of hair and a heavy mustache and other prominent features that are brought out by tonal qualities of the image.

Until the development of the instant process, candy portraits were limited to likenesses done in caricature using rather crude procedures. The images recorded on the candy support were of extremely poor quality and the production of anything approaching a true likeness of the original was generally unattainable. By contrast, employing the technique of the present imaging process allows a photographic image original to be recorded upon chocolate bars, chocolate lollipops and the like at a cost that is not prohibitive. The starting original can be a black-and-white photograph or a color picture showing a well-defined image of the original. The photograph as initially recorded on film contains a continuous tone image along with an infinite number of tonal shades ranging between these extreme light and dark values.

As is well-known in the printing art, continuous tone photographs can be reproduced in a large number of mediums such as newsprint and magazines. The continuous tone original is first converted into a halftone image which, unlike line art, creates the effect of continuous tone to the eye.

Although the present invention does not involve a printing process, in one embodiment the initial steps in recording the image can be similar to those used in the printing art in that an etched halftone image of the original is initially produced in a photoengraving plate. The picture 10 shown in FIG. 1 is a halftone image of the original that has been created upon a transparent material 11 using well-known halftone image techniques. As can be seen, the halftone image is a portrait of a person and clearly brings out the tones found in and about the facial region. The region along the bridge of the nose, for example, is highlighted and contains smaller cells or dots. The hair region at 13, however, which is dark, contains large dots and therefore appears dark to the eye. Between these two extremes, the size of the dots in the pattern varies to create the illusion or effect of a continuous tonal image depicting other facial features. The end result is a high quality image that is of photographic quality faithfully capturing the details found in the original. A reverse or negative halftone transparency is then made from the halftone image.

The negative halftone transparency bearing the reverse halftone portrait of the original is employed in the process to expose a photoengraving plate that has been coated with a soluble light-sensitive photo-etch material. The plate is preferably made of magnesium or aluminum, both of which react predictably with known acids. The transparency is placed over the photosensitive coating and the coating is exposed through the transparency to ultraviolet light or light at a wavelength that will react with the coating to render it insoluble in the light-exposed regions. A latent image of the reverse halftone image is thus recorded on the plate surface with the light or clear (as in the negative halftone transparency) regions (corresponding to the dark regions of the original image) being recorded as insoluble areas and the remaining regions as soluble regions. The exposed plate is washed with a suitable solvent to remove the coating in the unexposed regions, thereby revealing the underlying metal. The exposed coating remains.

The washed plate is now placed in an acid bath and the acid is allowed to attack the unprotected metal for a sufficient period of time to produce relatively deep recesses in the unexposed region. The depth of the etch is considerably greater than that used in preparing a printing plate. The reason for the deep etch will become apparent from the disclosure below.

Figure 2:
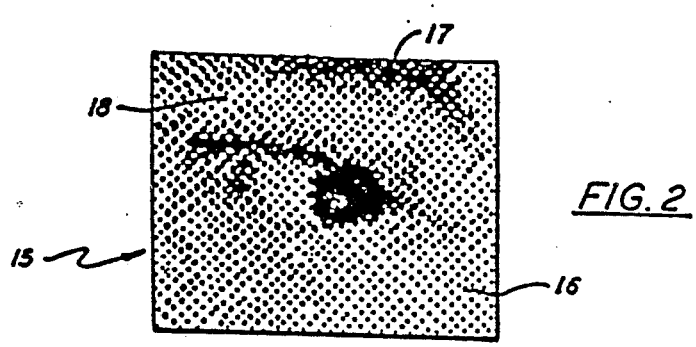
FIG. 2 is a partial view showing a portion of an etched photoengraving plate that has been exposed to a reverse halftone image of an original and then etched or washed so that the cells appear as raised peaks terminating in the plane of the plate surface and being connected by recesses etched or washed in the plate to a desired depth.

When the etch has reached a desired depth, the plate is removed from the bath and the residual acid on the plate is neutralized with water. The plate is then dried. The coating will normally be allowed to remain on the plate. FIG. 2 shows a portion of the etched plate 15 illustrating a region about the subject's eye greatly enlarged.

As can be seen, the halftone dots are represented as raised cells 16, each one of which is terminated or cut off in the plane described by the top surface of the plate. The cells, where they do not blend together to provide solid area coverage, such as at the eyebrow 17, are connected by recesses 18. As clearly seen, highlighted areas contain smaller cells or dots, while shadow areas contain heavy solid area dot coverage. It should be carefully noted that because of this etching process, the peak of the raised areas making up the halftone pattern are all cut off in a common plane. This is an extremely important step in the instant process which allows the image to be ultimately transferred to the final support without loss of quality or image fidelity. As should be evident, the depth of the recesses will vary and, more importantly, the bottom of each recess will be generally ragged and non-uniform. As will become apparent from the disclosure below, the image finally recorded on the support material using the transfer step of the invention would be made up of a series of jagged peaks of non-uniform height in which information would either be faintly visible or totally lost.

Figure 3:
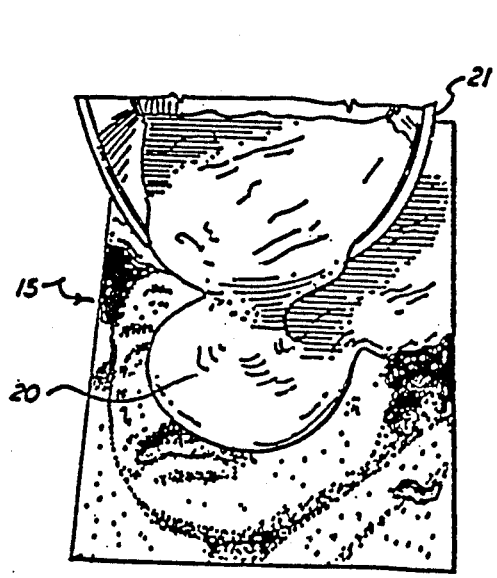
FIG. 3 is a view showing a flexible mold material being poured against the imaged surface of the plate shown in FIG. 2 to create a transfer plate bearing a reverse image of the original.

The etched plate bearing the halftone dot pattern is used to generate a second transfer plate or blanket which is used to transfer the true image of the original recorded on the first etched plate 15 onto the final support material. To prepare the transfer blanket, a rubber-like mold material 20 which is self-curing is poured over the imaged surface of etched plate 15 as shown in FIG. 3. Of course, other materials may be used for the transfer blanket, such as silicone in uncured sheet form.

Figure 4:
FIG. 4 shows the imaged face of the flexible transfer plate after it has cured against the etched plate.

Although not shown, the plate 15 may be enclosed by a raised frame during the pouring process which contains the flexible mold material within the imaged region. The mold material is poured to a desired thickness and then allowed to cure against the imaged plate surface. The mold material is able to fill the recesses between the cells formed in the plate and thus records a reverse image of the original in the molded face of the transfer blanket. Here again, it is important to note that the tops of the cells all terminate in a common plane residing inside the blanket. After curing, the blanket or intermediate plate is peeled back from the etched plate. As illustrated in FIG. 4, the image recorded in the molding face of the transfer blanket 25 shows the original dark areas as being recessed 27 and the original light areas as being raised 28.

The transfer blanket 25 may be fabricated from any number of well-known rubber-like synthetic materials that are capable of curing against an imaged plate as described above to create an imaged strip suitable for use in a downstream molding process. Urethane or silicone materials of this nature are readily available under a number of different trade names. The cured blanket should exhibit high tear strength and sufficient flexibility to permit it to be peeled away from the etched plate or a final support material without damaging the image recorded therein. This combination of strength and flexibility is important when the blanket is used to mold certain hard plastics or the like that might tend to tear the mold, particularly in the imaged regions, during separation.

Figure 5:
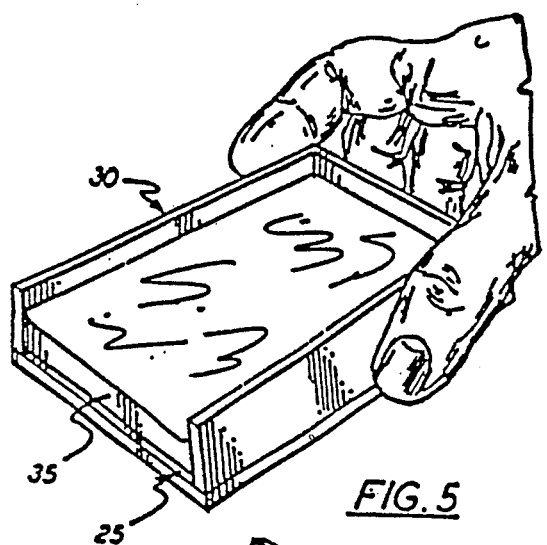
FIGS. 5-8 illustrate the steps in using the transfer plate for a true image of the original photograph in a final support material.

Turning now to FIGS. 5-8, the flexible transfer blanket 25 is used to create a true image of the original in a castable final support material which, for the purpose of this disclosure, will be chocolate candy. The image blanket is mounted with its imaged face up in the bottom of a molding tray 30 (FIG. 5), one side of which has been removed so that the inside of the tray can be more clearly viewed. The blanket is shown seated in a flat plane in the bottom of the tray. However, because of its flexibility, the blanket can be wrapped or seated upon a curved backing wall when arcuate-shaped articles such as candies or lollipops are being manufactured, provided that the plane in which the cells terminate describes a smooth continuous surface that will not distort the image to any great extent. As illustrated in FIG. 5, the final support material, which in this case is chocolate, is poured into the mold over the mold face of the transfer blanket to a desired depth.

Figure 6:
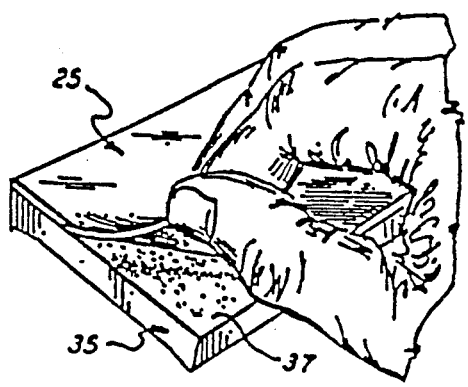
Figure 7:
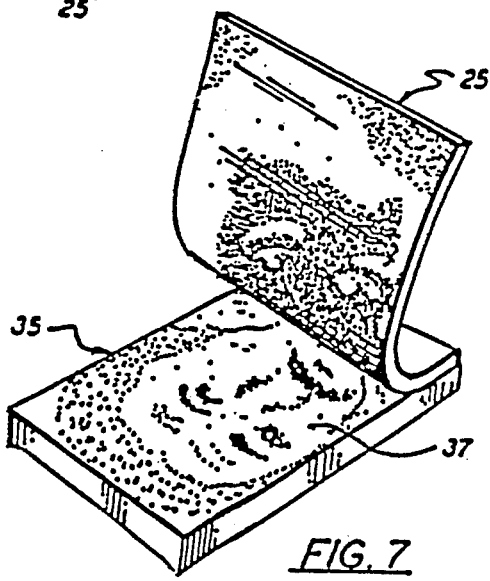
Figure 8:
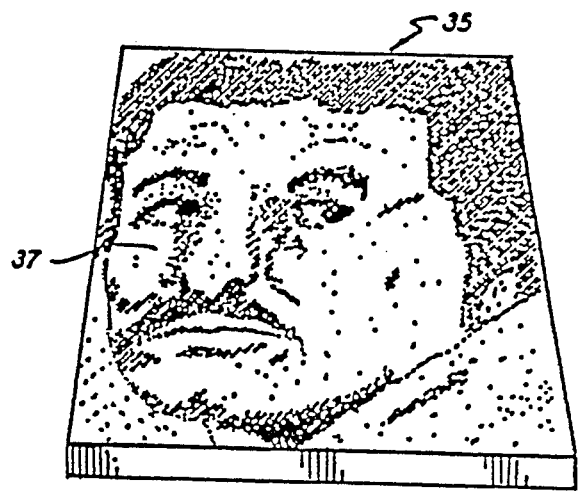

After the block of chocolate has solidified or hardened, it is removed from the tray along with the transfer blanket 25. As shown in FIG. 6, the blanket is removed from the chocolate simply by pulling up one corner of the blanket and carefully peeling the blanket away from the top surface 37 of the chocolate. Here again, the flexibility of the mold strip comes into play. The strip should have a low enough durometer (softness) so that as it is being pulled away from the chocolate it will not physically damage the raised peaks embossed in the chocolate which define the halftone gradations. FIG. 7 shows the strip in the final stages of removal and the faint but discernible image that is left behind in the chocolate support material. FIG. 8 shows the imaged block of chocolate tilted to emphasize the shadows and thus more clearly outline the recorded image. As can be seen, the image is a faithful halftone replica of the original that accurately displays all the facial features found in the original subject matter. The fidelity of the image is comparable to that of a photograph appearing in newsprint or magazines and thus provides a picture of a quality infinitely greater than anything now available in the art for manufacturing low priced items.

Figure 9:
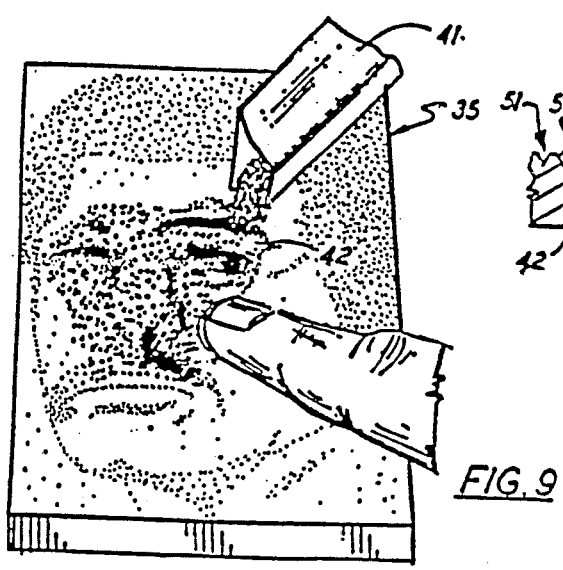
FIG. 9 illustrates an image support material that has been developed by placing a colored filler in the recesses formed between the raised density cells.

FIG. 9 illustrates one means of developing the image recorded in the chocolate support material. Typically, the contrast between highlights and shadows is low on a single color support material, particularly where the support is dark, as here. To develop or bring out the image data, a different colored filler is placed in the recesses formed between the raised cells in the imaged region. In the case of a dark chocolate, a white or light tinted filler would be used which can be tapped onto the chocolate by a finger. The reverse would be true if the chocolate were light (white chocolate).

As shown in FIG. 9, a white powdered sugar 42 is sprinkled from a container 41 over the imaged surface 37 of the support so that the powder completely fills or, preferably, overfills the recesses. The imaged surface is then lightly squeegeed using any suitable means to remove the filler from the tops of the cells. As noted above, all cells terminate in a common plane which, because of the double image transfer process, now lies in the plane described by the top surface of the support. Accordingly, the squeegeeing will clear the top of the support to reveal an extremely clear, high quality image of the original. As can be seen, if the cell peaks terminated in other than a smooth continuous plane, the image quality would be severly degraded, the peaks of at least some of the cells would be easily broken and developing of the image with a filler practically useless. Although a white powdered sugar is shown in this embodiment of the invention, tinted icings, such as those used to frost cakes and cupcakes, can also be used effectively as fillers. These icings can be easily wiped from the top of the cells and will set up in the recesses to provided a long-lasting developer that is not readily dislodged. Fusible filler can also be used which can be heated or otherwise treated so as to bond to the support material.

Figure 10:
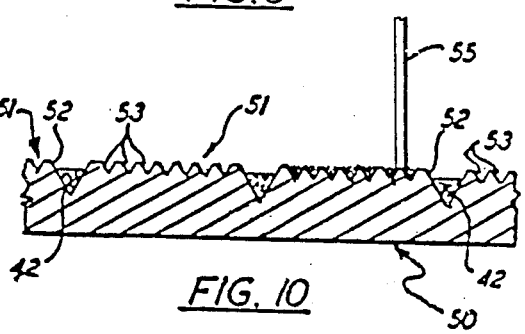
FIG. 10 is a partial enlarged side view in section of a final support that has been further treated to hide the recorded information until such time as the filler is placed in the recesses.

When using the image support as a greeting card, it might be desirable to have the recipient develop the image himself or herself. The image, it has been found, can be hidden from view until after development by randomly forming a series of shallow indentations in the imaged surface of the final support material. The shallow indentations will reside at the top of the cell peaks and, prior to development, hide or mask the image information contained in the cells. As illustrated in FIG. 10, the final support 50 is cast as explained above to create recesses 52—52 between peak regions 51—51 formed of single or merged cells. A series of shallow indentations 53—53 are placed in the peaks. As shown, the indentations are extremely shallow when compared to the recesses and are randomly dispersed so that they will not carry any intelligent information. The image data, however, will be lost in the random pattern. To render the image visible, the developer is placed on the imaged surface of the support, as explained in conjunction with FIG. 9, and the surface lightly squeegeed using paper or a business card or some other device that performs squeegeeing 55. Light squeegeeing will remove the developer from the cell peaks and shallow indentations to reveal a clear sharp image.

Figure 11:
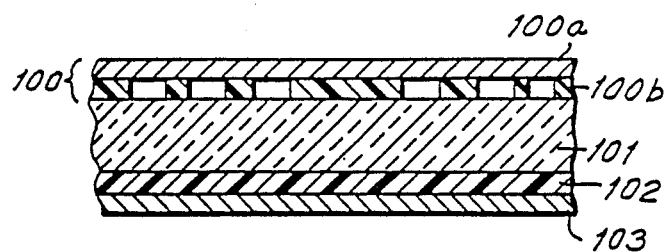
FIGS. 11-15 illustrate a further embodiment of the present method.

While the embodiment of the invention just described produces photographic likeness images in the surface of chocolate material, an alternative embodiment is described herein which likewise produces photographic likeness images in chocolate. In the alternative embodiment shown in FIGS. 11-15, as with the first embodiment shown in FIGS. 1-10, a continuous tone photograph is utilized to form a halftone image thereof on a film. The film in FIG. 11 is identified by the reference numeral 100 and includes a base 100a and an emulsion 100b. The film is placed over a photosensitive element 101 which, in this case, is a photosensitive photopolymer. Examples of such a photopolymer would be Dupont Cyrel, UniRoyal Flexlight, TOK made by Miraclon of Japan and Toyoba of Japan. In addition, BASF of Germany and Toray of Japan, respectively, each have a photopolymer which would be suitable. If desired, liquid photopolymer could be used. The base 102 of the photopolymer is preexposed to preharden the same. Beneath base 102 is a bonded metal strip 103 for support purposes.

Figure 12:
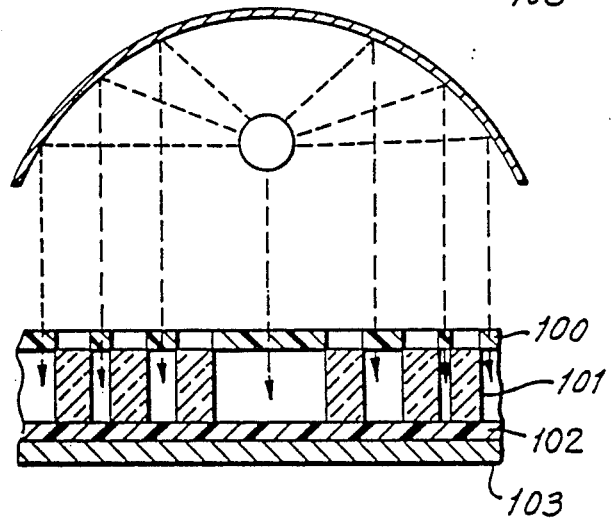

As shown in FIG. 12, located above film 100 is a source of ultraviolet light 104 which is energized for a pre-selected amount of time so that an image on the photopolymer will be formed which corresponds to the image found on film 100. After the photopolymer has been exposed, the unexposed areas of the photopolymer are washed away with water, or suitable chemicals if a water washout is not used, with the exposed areas in raised peaks as shown in FIG. 12. Alternatively, high-intensity steam or brushes may be used to wash away the unexposed areas. The photopolymer photosensitive element will now have on it peaks and valleys which correspond to the halftone image found in the film.

Figure 13:
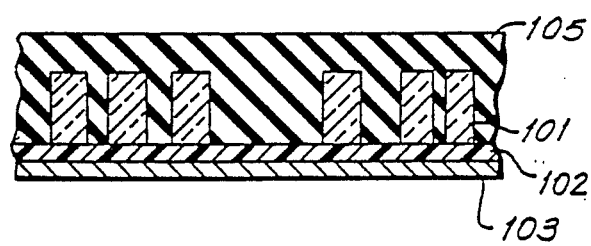
Figure 14:
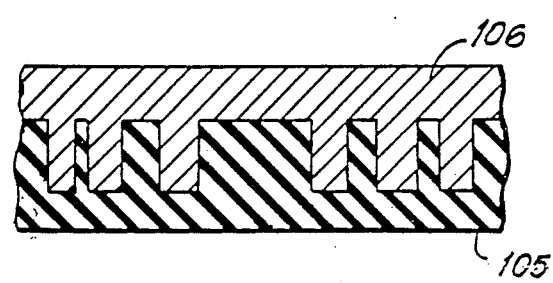
Figure 15:
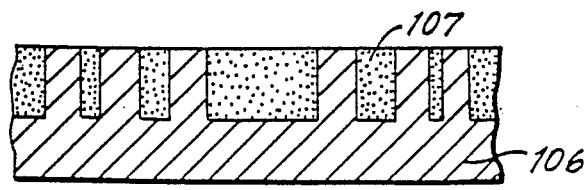

As can be seen in FIG. 13, the photopolymer has relief-formed valleys which generally have steep sides and are uniform. The advantage of this, of course, is that the image formed from the photopolymer element has a very high quality photographic likeness. It is important to note that the tops of the peaks are formed in a common plane.

The next step in the process is to cast a silicone rubber 105 transfer blanket onto the photopolymer to form an image on the silicone rubber by peaks and valleys that correspond to the image on the film and which is a reversal thereof. If desired, the photopolymer may be enclosed by a raised frame during the casting of the silicone rubber thereon. The silicone rubber will be formed to a desired thickness and allowed to cure against the photosensitive element. Here again, it is important to note that the tops of all the peaks are in a common plane. Chocolate 106 is then cast onto the silicone rubber which will have an image formed thereon by means of peaks and valleys which is a reversal of the image on the silicone rubber. Because of the uniformity of the indentations on the silicone rubber transfer blanket, the chocolate indentations will likewise be uniform and the peaks at the same height.

When the chocolate is cast onto the silicone rubber transfer blanket, a frame can be placed about the blanket, as was previously described herein. The chocolate will be cast to the desired thickness and allowed to harden.

A confectionary product 107 which has a coloration distinct from that of the chocolate is placed on top of the chocolate product and squeegeed or otherwise removed from the top surface of the chocolate product so that it only fills the indentations thereon. The effect this has is of instantly developing the image formed on the chocolate. Alternatively, heat or hot moisture can be applied to the formed image causing the white to be whiter and the dark to be darker, which increases the contrast if desired.

While the embodiments of the invention described above produce photographic likeness images in the surface of chocolate material, a further alternative embodiment is described herein which likewise produces photographic likeness images in chocolate. In the alternative embodiment shown in FIG. 16, as with the first and second embodiments shown in FIGS. 1-15, a continuous tone photograph 202 is utilized to form a halftone image 204 thereof on a film. The film may be similar to that shown in FIGS. 1 or 11. In accordance with the embodiment of FIG. 16, the halftone image 204 is scanned by a laser or optical sensor in step 206. At the same time, a control circuit which is well known, detects the scanning by the scanning laser and, in response to such scanning, controls the movement and duration of an etching laser in step 208 which carves out areas on the surface of a positive plate so that the positive plate will have peaks and valleys which correspond to the halftone image found in the film, such as shown in by the plate formed in FIG. 13. Thus, the etched positive plate has a very high quality photographic likeness. It is important to note that the tops of the peaks are formed in a common plane, as with the aforementioned embodiments. It is further important to note that, with use of a laser, all dots, and/or all lines, that are burned or etched into the positive plate are of the same size (diameter and depth).

The use of such laser scanning and etching techniques are well known in the art. In this regard, reference is made to U.S. Pat. No. 4,240,119 to Norton et al; U.S. Pat. No. 4,080,634 to Schreiber and U.S. Pat. No. 4,110,796 to Aughton.

The next step 210 in the process is to pour a silicone rubber material on the etched plate to cast a silicone rubber transfer blanket on the etched plate. This forms an image on the silicone rubber by peaks and valleys that correspond to the image on the film and which is a reversal thereof. If desired, the positive plate may be enclosed by a raised frame during the casting of the silicone rubber thereon. The silicone rubber will be formed to a desired thickness and allowed to cure against the etched plate. The silicone rubber mold or transfer blanket is then removed from the etched plate in step 212, and, in step 214, chocolate is then cast onto the silicone rubber transfer blanket which will have an image formed thereon by means of peaks and valleys which is a reversal of the image on the silicone rubber transfer blanket. Because of the uniformity of the indentations on the silicone rubber transfer blanket, the chocolate indentations will likewise be uniform and the peaks at the same height.

When the chocolate is cast onto the silicone rubber transfer blanket in step 214, a frame can be placed about the blanket, as was previously described herein. The chocolate will be cast to the desired thickness and allowed to harden, and the silicone rubber transfer blanket will be removed from the cast chocolate in step 216.

A confectionary product which has a coloration distinct from that of the chocolate is placed on top of the chocolate product and squeegeed or otherwise removed from the top surface of the chocolate product so that it only fills the indentations thereon, in step 218. The effect this has is of instantly developing the image formed on the chocolate. Alternatively, heat or hot moisture can be applied to the formed image causing the white to be whiter and the dark to be darker, which increases the contrast if desired.

A still further alternative embodiment is now described herein which likewise produces photographic likeness images in chocolate. Thus, in the embodiment shown in FIG. 17, a continuous tone photograph or real life image 302 is scanned by a television camera in step 304 and displayed on a screen of a television monitor in step 306 by a plurality of lines, each line formed by discretely energized dots, as is well known. One frame of the displayed picture is then frozen on the screen in step 308, and the scanning of the frozen frame is supplied to a conventional control circuit which, in response thereto, controls the movement and activity of an etching laser in step 310 which carves out areas on the surface of a positive plate so that the positive plate will have peaks and valleys which correspond to the digitized image. Thus, the etched positive plate has a very high quality photographic likeness. It is important to note that the tops of the peaks are formed in a common plane, as with the aforementioned embodiments. It is further important to note that, with use of a laser, all dots, and/or all lines, that are burned or etched into the positive plate are of the same size diameter. Tonal variations are visually created by closeness of dots, rather than diameter.

The use of optical scanning techniques is well known in the art, for example, as disclosed in U.S. Pat. No. 4,130,834 to Mender et al in conjunction with a writing instrument. It will be appreciated that such writing instrument could be a laser as taught in the aforementioned U.S. Pat. Nos. 4,080,634; 4,110,796; and 4,240,119.

The next step 312 in the process is to pour a silicone rubber material on the etched plate to cast a silicone rubber transfer blanket on the etched plate. This forms an image on the silicone rubber by peaks and valleys that correspond to the image on the film and which is a reversal thereof. If desired, the positive plate may be enclosed by a raised frame during the casting of the silicone rubber thereon. The silicone rubber will be formed to a desired thickness and allowed to cure against the etched plate. The silicone rubber mold or transfer blanket is then removed from the etched plate in step 314, and, in step 316, chocolate is then cast onto the silicone rubber transfer blanket which will have an image formed thereon by means of peaks and valleys which is a reversal of the image on the silicone rubber transfer blanket. Because of the uniformity of the indentations on the silicone rubber transfer blanket, the chocolate indentations will likewise be uniform and the peaks at the same height.

When the chocolate is cast onto the silicone rubber transfer blanket in step 316, a frame can be placed about the blanket, as was previously described herein. The chocolate will be cast to the desired thickness and allowed to harden, and the silicone rubber transfer blanket will be removed from the cast chocolate in step 318.

A confectionary product which has a coloration distinct from that of the chocolate is placed on top of the chocolate product and squeegeed or otherwise removed from the top surface of the chocolate product so that it only fills the indentations thereon, in step 320. The effect this has is of instantly developing the image formed on the chocolate. Alternatively, heat or hot moisture can be applied to the formed image causing the white to be whiter and the dark to be darker, which increases the contrast if desired. A reversal of the processes just described will enable one to use light colored chocolate with a dark filler.

Having described specific preferred embodiments of the present invention, it will be appreciated that the present invention is not limited to those precise embodiments and that various changes and modifications can be effected therein by one of ordinary skill in the art without departing from the spirit or scope of the invention as defined in the appended claims.

What is claimed is:

1. A method of reproducing in chocolate a selected image, comprising the steps of:
   optically scanning the image,
   laser etching the selected image in a surface of a plate in response to said optical scanning such that peaks and valleys are created in the surface of the plate corresponding to the selected image,
   casting a deformable transfer blanket against the surface of the etched plate to record in a surface of the transfer blanket peaks and valleys corresponding to the selected image,
   removing the cast transfer blanket from the surface of the etched plate,
   casting a chocolate material against the surface of the transfer blanket to record the selected image by peaks and valleys in a surface of the chocolate, and
   removing the cast chocolate material from the transfer blanket.

2. A method according to claim 1 further including the step of placing an edible developer that contrasts in color with the cast chocolate in the valleys formed in the chocolate with the chocolate peaks protruding above the developer to render the selected image formed in the chocolate visible with photographic likeness.

3. A method according to claim 2 wherein the edible developer is confectionary or powdered sugar.

4. A method according to claim 1 wherein all the peaks in the chocolate terminate in a common plane.

5. A method according to claim 1 wherein the deformable transfer blanket is fabricated from a synthetic rubber.

6. The chocolate product produced by the method of claim 1.

7. A method of reproducing in chocolate a selected image from a fulltone photograph with photographic likeness, comprising the steps of:
   forming on film a halftone image of the selected image located on the photograph,
   optically scanning the film,
   laser etching the selected halftone image on the film in a surface of a plate in response to the optical scanning of the film by means of a laser, such that peaks and valleys are created in the surface of the plate corresponding to the selected image,
   casting a deformable transfer blanket against the surface of the etched plate to record in a surface of the transfer blanket peaks and valleys corresponding to the selected image,
   removing the cast transfer blanket from the surface of the etched plate,
   casting a chocolate material against the surface of the transfer blanket to record the selected image by peaks and valleys in a surface of the chocolate, and
   removing the cast chocolate material from the transfer blanket.

8. A method according to claim 7 further including the step of placing an edible developer that contrasts in color with the cast chocolate in the valleys formed in the chocolate with the chocolate peaks protruding above the developer to render the selected image formed in the chocolate visible with photographic likeness.

9. A method according to claim 8 wherein the edible developer is confectionary or powdered sugar.

10. A method according to claim 7 wherein all the peaks in the chocolate terminate in a common plane.

11. A method according to claim 7 wherein the deformable transfer blanket is fabricated from a synthetic rubber.

12. A method according to claim 7 wherein said step of optically scanning includes the step of laser scanning the film.

13. A method according to claim 12 further including the step of controlling movement and magnitude of the laser in response to laser scanning of the film to control said laser etching of the selected halftone image on the film in a surface of a plate, such that peaks and valleys are created in the surface of the plate corresponding to the selected image.

14. The chocolate product produced by the method of claim 7.

15. A method of reproducing in chocolate a selected image from a continuous tone image, comprising the steps of:
   optically scanning the continuous tone image,
   laser etching the selected image in a surface of a plate by means of a laser in response to said optical scanning such that peaks and valleys are created in the surface of the plate corresponding to the selected image,
   casting a chocolate material against the surface of the etched plate to record in a surface of the transfer blanket peaks and valleys corresponding to the selected image,
   removing the cast transfer blanket from the surface of the etched plate,
   casting a chocolate material against the surface of the transfer blanket to record the selected image by peaks and valleys in a surface of the chocolate,
   removing the cast chocolate material from the transfer blanket, and
   placing an edible developer that contrasts in color with the cast chocolate in the valleys formed in the chocolate with the chocolate peaks protruding above the developer to render the selected image formed in the chocolate visible with photographic likeness.

16. A method according to claim 15 wherein all the peaks in the chocolate terminate in a common plane.

17. A method according to claim 15 wherein the edible developer is confectionary or powdered sugar.

18. A method according to claim 15 wherein the deformable transfer blanket is fabricated from a synthetic rubber.

19. A method according to claim 15 further including the step of controlling movement and magnitude of the laser in response to said optical scanning to control said laser etching of the selected image in a surface of the plate, such that peaks and valleys are created in the surface of the plate corresponding to the selected image.

20. The chocolate product produced by the method of claim 15.

21. A process of forming in chocolate a desired image with photographic likeness from a fulltone photograph having the desired image, comprising the steps of:
  developing a halftone image of the desired image on a transparent material from the fulltone photograph;
  forming a photorelief image of the developed halftone image in a surface of a photosensitive element such that peaks and valleys are created in the photosensitive element surface corresponding to the desired image;
  casting a casting material on the photosensitive element to form a deformable transfer blanket with a surface having peaks and valleys corresponding to the selected image;
  removing said formed transfer blanket from said photosensitive element;
  pouring a chocolate material on the surface of the transfer blanket;
  permitting the chocolate material to harden on the surface of the transfer blanket;
  removing the hardened chocolate material from the blanket such that a surface of the chocolate material has peaks and valleys corresponding to the desired image; and
  placing an edible developer on the surface of the hardened chocolate with the chocolate peaks protruding above the developer and said developer contrasting in color with the surface of the hardened chocolate to render the selected image formed in the chocolate visible in the chocolate product.

22. A process according to claim 21, wherein all the peaks in the chocolate terminate in a common plane.

23. A process according to claim 21, wherein the edible developer is confectionary or powdered sugar.

24. A chocolate product produced by the process of claim 21.

25. A process of forming in chocolate a desired image with photographic likeness from a fulltone photograph having the desired image, comprising the steps of:
  developing a halftone image of a desired image on a transparent material from the fulltone photograph;
  forming a photorelief image of the developed halftone image in a surface of a photosensitive element such that peaks and valleys are created in the photosensitive element surface corresponding to the desired image;
  casting a casting material onto the photosensitive element to form a deformable transfer blanket with a surface having peaks and valleys corresponding to the selected image;
  removing said formed transfer blanket from said photosensitive element; and
  casting a chocolate material onto the surface of the transfer blanket to record the selected image by peaks and valleys in a surface of the chocolate.

26. The chocolate product produced by the process of claim 25.

* * * * *